US012055751B2

(12) United States Patent
    Mason

(10) Patent No.: US 12,055,751 B2
(45) Date of Patent: Aug. 6, 2024

(54) WAVEGUIDE AND METHOD FOR FABRICATING A WAVEGUIDE

(71) Applicant: BAE SYSTEMS plc, London (GB)

(72) Inventor: Stephen Paul Mason, Rochester (GB)

(73) Assignee: BAE SYSTEMS PLC, London (GB)

( * ) Notice: Subject to any disclaimer, the term of this patent is extended or adjusted under 35 U.S.C. 154(b) by 319 days.

(21) Appl. No.: 17/753,349

(22) PCT Filed: Aug. 24, 2020

(86) PCT No.: PCT/GB2020/052030
§ 371 (c)(1),
(2) Date: Feb. 28, 2022

(87) PCT Pub. No.: WO2021/044123
PCT Pub. Date: Mar. 11, 2021

(65) Prior Publication Data
US 2022/0317362 A1  Oct. 6, 2022

(30) Foreign Application Priority Data

Sep. 6, 2019 (GB) ...................................... 1912819
Oct. 17, 2019 (EP) ...................................... 19275094

(51) Int. Cl.
*F21V 8/00* (2006.01)
*B29D 11/00* (2006.01)
(Continued)

(52) U.S. Cl.
CPC ...... *G02B 6/0065* (2013.01); *B29D 11/00663* (2013.01); *B29D 11/00769* (2013.01);
(Continued)

(58) Field of Classification Search
CPC .. G02B 6/0016; G02B 6/0038; G02B 6/0065; G02B 27/0101; G02B 2027/0123; B29D 11/0063; B29D 11/00769
See application file for complete search history.

(56) References Cited

U.S. PATENT DOCUMENTS 5,710,849 A    1/1998  Little et al.
9,310,566 B2 *  4/2016  Valera .................. G02B 6/0065
                        (Continued)

FOREIGN PATENT DOCUMENTS

CA      2976955 A1    9/2016
JP    2012252168 A   12/2012
                (Continued)

OTHER PUBLICATIONS

International Preliminary Report on Patentability received for PCT/GB2020/052030, mail date Mar. 17, 2022. 8 pages.
(Continued)

*Primary Examiner* — Daniel Petkovsek
(74) *Attorney, Agent, or Firm* — Finch & Maloney PLLC

(57) ABSTRACT

There is provided a method for fabricating a waveguide. The method comprising fabricating a first master grating tool comprising a first tool substrate having a surface with an area corresponding at least to the area of a surface of the waveguide and having a first grating profile formed over substantially all of the surface of the first tool substrate. Fabricating a second master grating tool comprising a second tool substrate having a surface with an area corresponding at least to the area of the surface of the waveguide and having a second grating profile formed over substantially all of the surface of the second tool substrate. Using the first master grating tool to replicate the first grating profile over substantially all of a surface of a first waveguide substrate. Using the second master grating tool to replicate the second grating profile over substantially all of a surface of a second (Continued)

waveguide substrate. Applying a first dielectric layer over a selected area of the first grating profile replicated on the surface of the first waveguide substrate. Applying a second dielectric layer over a selected area of the second grating profile replicated on the surface of the second waveguide substrate. Applying a layer of laminating material to at least one of the surfaces of the first and second waveguide substrates and bringing the surfaces of the first and the second waveguide substrates together thereby to join the first and second waveguide substrates together by an intermediate lamination layer.

20 Claims, 10 Drawing Sheets

(51) Int. Cl.
    *G02B 5/18*     (2006.01)
    *G02B 6/00*     (2006.01)
    *G02B 27/01*     (2006.01)

(52) U.S. Cl.
    CPC ......... *G02B 5/1852* (2013.01); *G02B 6/0016* (2013.01); *G02B 6/0038* (2013.01); *G02B 27/0101* (2013.01); *G02B 27/0172* (2013.01); *G02B 2027/0123* (2013.01)

(56) References Cited

U.S. PATENT DOCUMENTS

| | | | |
|---|---|---|---|
| 2004/0151626 A1 | 8/2004 | Cunningham et al. | |
| 2009/0225422 A1 | 9/2009 | Suleski et al. | |
| 2012/0044572 A1 | 2/2012 | Simmonds et al. | |
| 2012/0064303 A1* | 3/2012 | Yashiki | G02B 5/32 427/162 |
| 2015/0048047 A1 | 2/2015 | Liu et al. | |
| 2015/0086163 A1 | 3/2015 | Valera et al. | |
| 2016/0327705 A1 | 11/2016 | Simmonds et al. | |
| 2022/0317347 A1 | 10/2022 | Mason | |

FOREIGN PATENT DOCUMENTS

| | | |
|---|---|---|
| JP | 2014215375 A | 11/2014 |
| WO | 2010122330 A1 | 10/2010 |
| WO | 2012162286 A1 | 11/2012 |
| WO | 2019010857 A1 | 1/2019 |
| WO | 2021044121 A1 | 3/2021 |
| WO | 2021044123 A1 | 3/2021 |

OTHER PUBLICATIONS

International Preliminary Report on Patentability received for PCT/GB2020/052003, mail date Mar. 17, 2022. 10 pages.
International Search Report and Written Opinion received for PCT Application No. PCT/GB2020/052003. Mail date: Nov. 3, 2020. 11 pages.
GB Search Report under Section 17(5) received for GB Application No. 1912820.6, dated Feb. 21, 2020. 3 pages.
Extended European Search Report received for EP Application No. 19275099.0, dated Apr. 2, 2020. 38 pages.
GB Combined Search and Examination Report under Sections 17 and 18(3) received for GB Application No. 2012998.7, dated Feb. 12, 2021. 7 page.
Smith, et al., "Large Area Pulse Compression Gratings Fabricated Onto Fused Silica Substrates Using Scanning Beam Interference Lithography," Plymouth Grating Laboratory, 3rd Int'l Conf. Ultrahigh Intens. Lasers: Dev. Sci. Emerg. Appl (2008). 2 pages.
Smith, et al., "Large Area Pulse Compression Grating Fabricated Onto Fused Using Scanning Beam Interference Lithography," Plymouth Grating Laboratory, ICUIL, 2008. 20 pages.
International Search Report and Written Opinion received for PCT Application No. PCT/GB2020/052030. Mail date: Nov. 3, 2020. 9 pages.
GB Search Report under Section 17(5) received for GB Application No. 1912819.8, dated Feb. 21, 2020. 3 pages.
Extended European Search Report received for EP Application No. 19275094.1, dated Mar. 27, 2020. 8 pages.

* cited by examiner

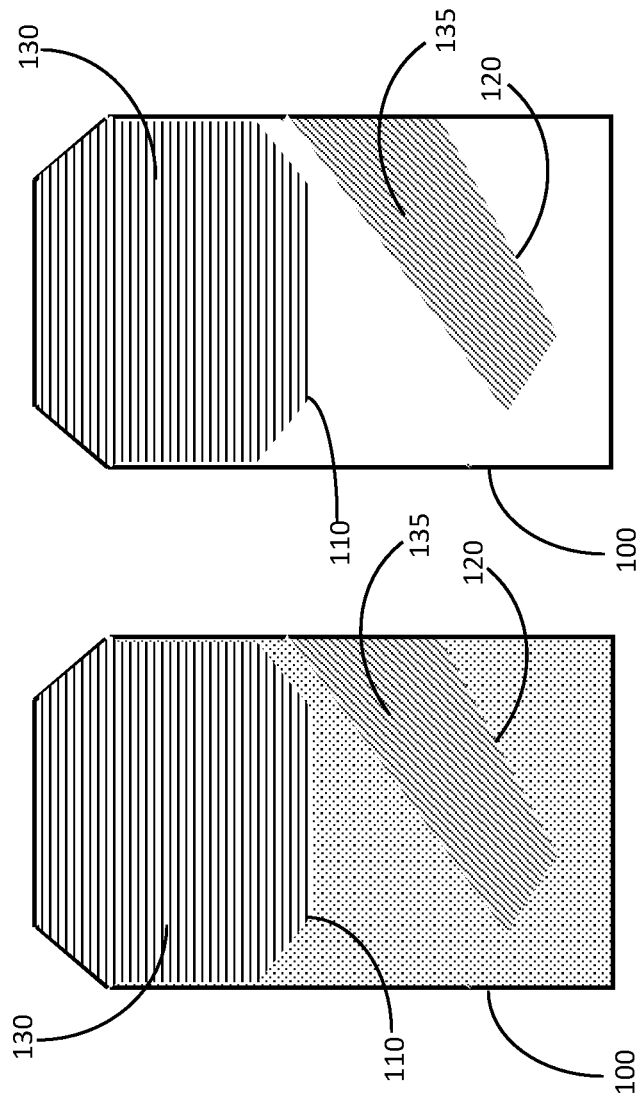

WAVEGUIDE AND METHOD FOR FABRICATING A WAVEGUIDE

FIELD OF THE INVENTION

This invention relates to waveguides to a method for fabricating a waveguide.

BACKGROUND

It has become increasingly common for display systems, in particular head or helmet-mounted display systems and head-up display systems, to use waveguides incorporating diffractive elements. Such waveguides may serve the multiple purposes of: conveying light from an image source to a line of sight to a viewer; of expanding the pupil of the image-bearing light in one or two dimensions as the light propagates through the waveguide, providing for a greater range of eye positions from which a user may view an image; and to act as a combiner in transparent displays so that the image to be displayed may be viewed overlain on the user's view of the outside world as seen through the transparent waveguide.

Two or three different diffraction gratings may be embedded within a waveguide or provided on or close to the surface of a waveguide to couple collimated light into and out of the waveguide and to cause expansion of the pupil of light. However, the fabrication of such waveguides and diffraction gratings to the tolerances required to achieve high image quality can be challenging, in particular when a large waveguide having large diffraction gratings is required.

BRIEF DESCRIPTION OF THE DRAWINGS

Embodiments of the present invention will now be described in more detail, by way of example only, with reference to the accompanying drawings of which.

DETAILED DESCRIPTION

An example of a known method for fabricating a transparent waveguide incorporating two main diffraction gratings will be described briefly with reference to FIG. 1.

Figure 1A:
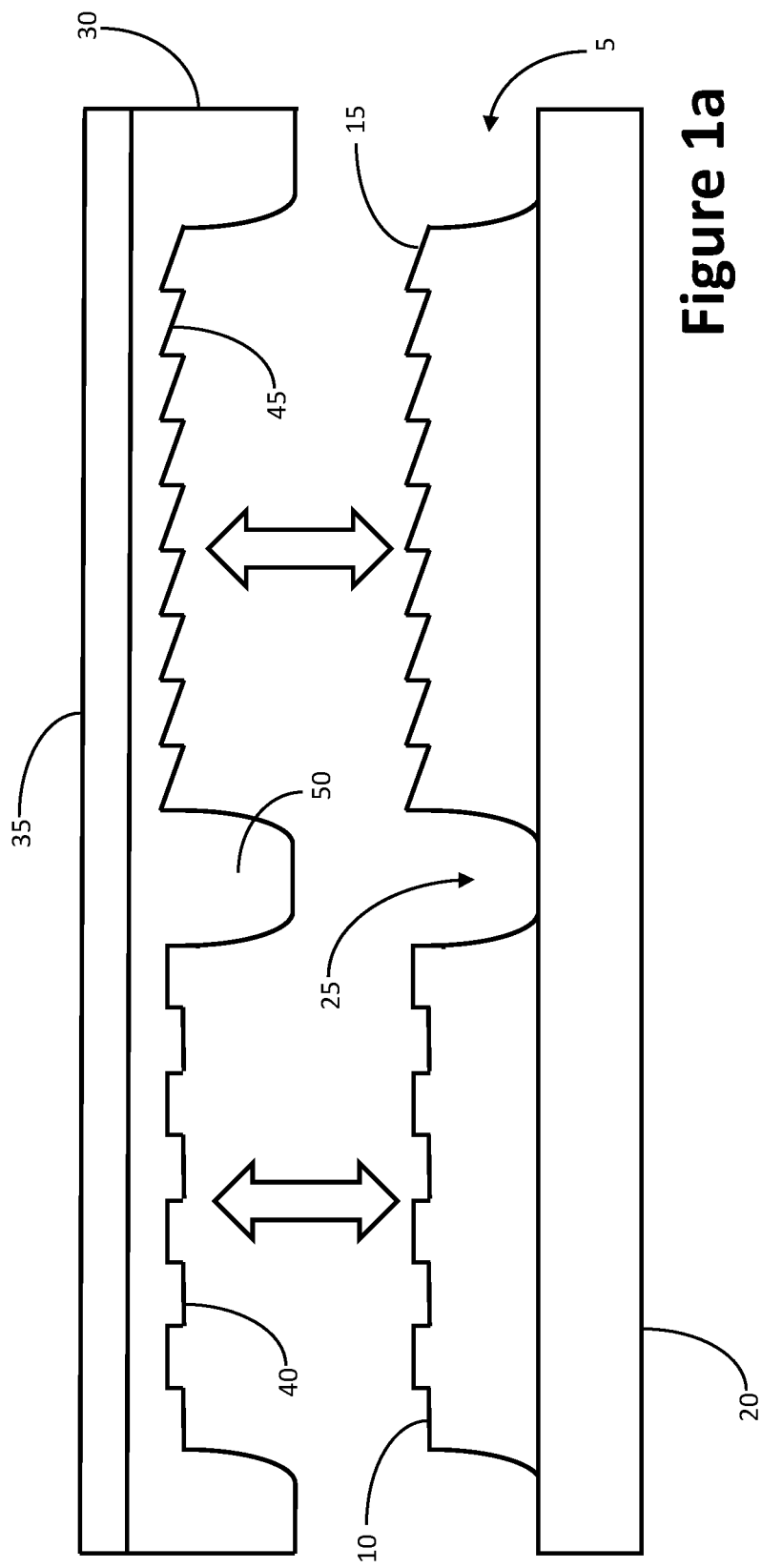
FIG. 1 is a representation of an example of a known method for fabricating a diffraction grating profile for a waveguide using a master grating tool and of an example of a known waveguide fabricated using the master grating tool.

Referring initially to FIG. 1a, an example shown in a sectional view, not to scale, is a representation of a master grating tool 5 that has been made for use in the fabrication of a waveguides having two diffraction grating regions with different grating profiles. The grating tool 5 comprises two different master gratings 10, 15, which would typically be fabricated separately and mounted upon a single grating tool substrate 20. To enable the two master gratings to be fabricated and then mounted on the tool substrate 20, they need to have a not insignificant thickness. Their thickness necessarily results in the two master gratings having edges which, in particular, form a gap 25 between the master gratings when fixed to the single section of tool substrate 20.

FIG. 1a also shows, in a sectional view, a representation of the result of one example method for replicating the master gratings 10, 15 comprising imprinting the master grating tool 5 into a "replication layer" 30 of a UV-curable polymer that had been applied to a glass base layer 35. FIG. 1a shows the replication layer 30 after UV curing of the polymer and removal of the master grating tool 5, leaving replicas 40, 45 of the master grating profiles 10, 15 respectively imprinted into the replication layer 30. A protrusion 50, one of three protrusions in this example, remains in the replication layer 30 corresponding to the gap 25 between the master gratings 10, 15 of the master grating tool 5. Besides imprinting, other methods are known for replicating a master grating profile 10, 15, including nano-imprint lithography. However, the protrusions, including the central protrusion 50, would remain as features in the resultant replication layer 30.

Figure 1B:
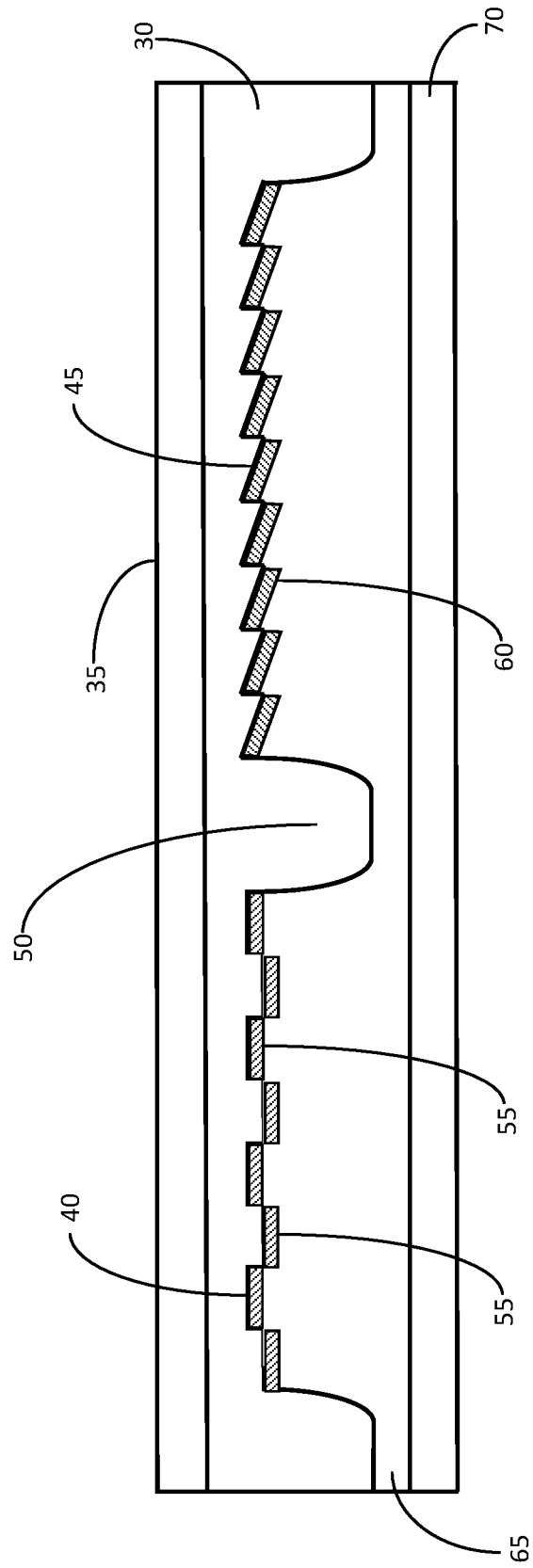

Referring to FIG. 1b, a representation of a completed waveguide structure is shown, in a sectional view, in which respective conformal layers 55, 60 of a dielectric material have been applied to the imprinted grating profiles 40, 45. A "lamination layer" 65 made of the same or a similar UV-curable polymer to that used for the replication layer 30 is applied to cover the replication layer 30, and another glass layer 70 is applied to the lamination layer 65, under some pressure to ensure that the lamination layer 65 fully conforms to the profile of the gratings 40, 45 with their dielectric coatings 55, 60, leaving no gaps. The UV-curable polymer of the lamination layer 65 is then cured to result in the structure shown in FIG. 1b.

In practice, the depth of the replication layer 60, and hence the depth of the protrusion 50 in the replication layer, are of the order of 30-40 μm. However, the effect of such protrusions, such as the protrusion 50, on light propagating through the waveguide structure shown in FIG. 1b may be significant, as will now be explained with reference to FIG. 1c.

Figure 1C:
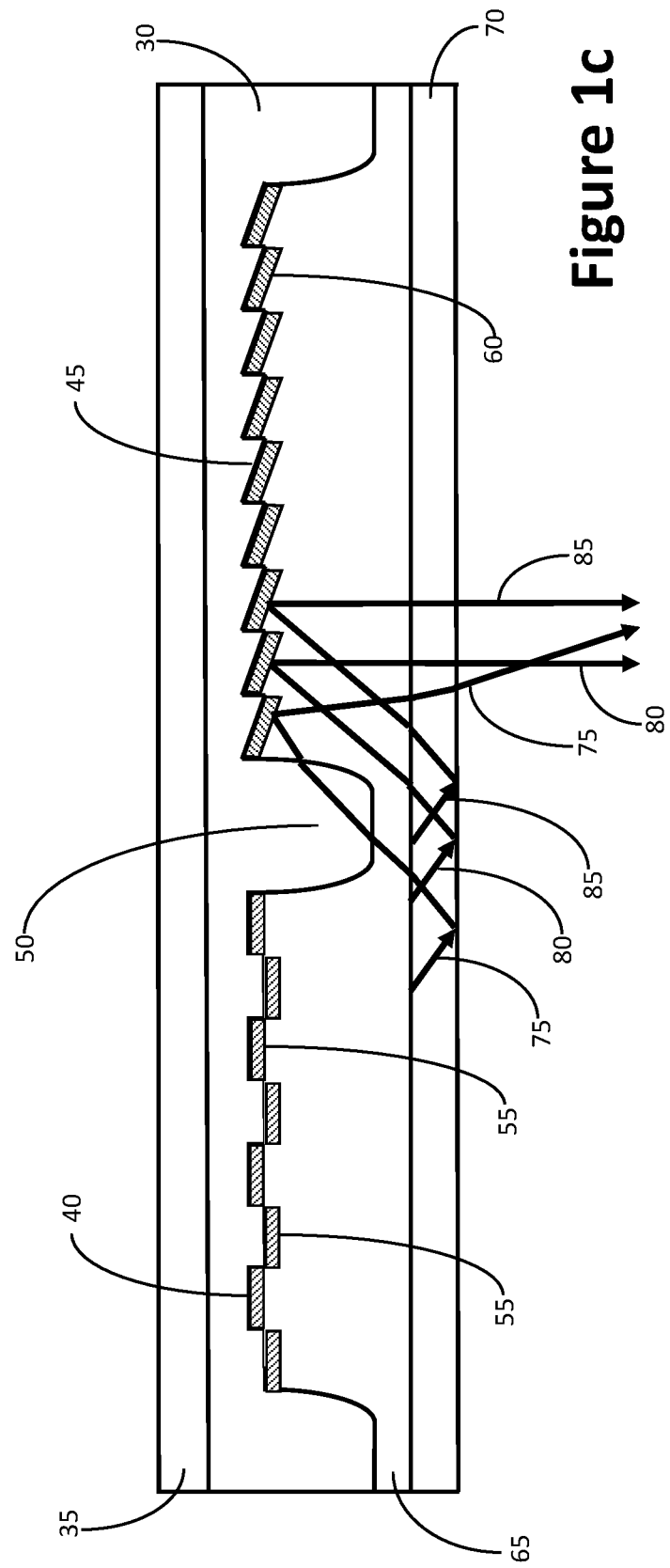

Referring to FIG. 1c some example light paths 75, 80, 85 of light propagating through the waveguide of FIG. 1b are shown. Light following either of the paths 80, 85 are diffracted by the second grating 45, 60 to emerge from the waveguide substantially at right-angles to the surface of the glass layer 70, as intended. However, light following the path 75 passes through the protrusion 50 in the replication layer and, due to slight differences in the refractive index of the materials used in the replication layer 30 and the lamination layer 65, the light eventually emerges from the glass layer 70 at an oblique angle to the surface of the glass layer 70, causing a viewer to see a secondary image. It has been shown by modelling and by experimentation that a difference of as little as +/−0.0003 in the refractive indices of the materials of the replication 30 and lamination layer 65 can cause a deviation of 0.5 mR or more in the light emerging from the waveguide, being sufficient deviation for a viewer to discern a secondary image. A person of ordinary skill in the relevant art would consider this a surprising result and would recognise that achieving a match in the refractive indices of UV-curable polymers for example, even when nominally the same material is used for the replication 30 and lamination layer 65, is difficult to achieve in practice. Differences in refractive index may arise for example due to slight differences in operating temperature of the replication and lamination layers, causing differences in refractive index of +/−0.0001 per ° C. Moreover, for a waveguide with an overall thickness of for example 5 mm, each protrusion in the replication layer due to an edge on the master grating tool 5 causes 0.6% to 0.8% of the light propagating through the waveguide to become diverted. An improved method for fabricating large waveguides is therefore required.

According to the present disclosure, in a first improvement, a different method has been devised for making a single master grating tool, for example a master grating tool having master grating profiles for two different diffraction gratings. The method will now be described in an example with reference to FIG. 2 and to FIG. 3.

Figure 2C:
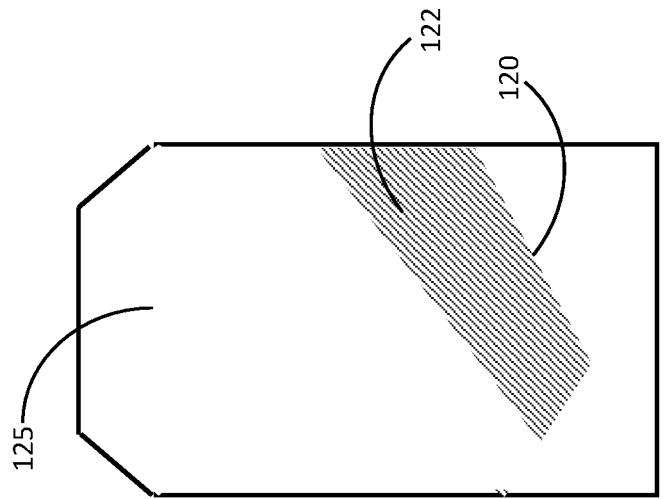
FIG. 2 is a representation of an example of a fabrication process according to the present disclosure for making a master grating tool according to the present disclosure.
Figure 2B:
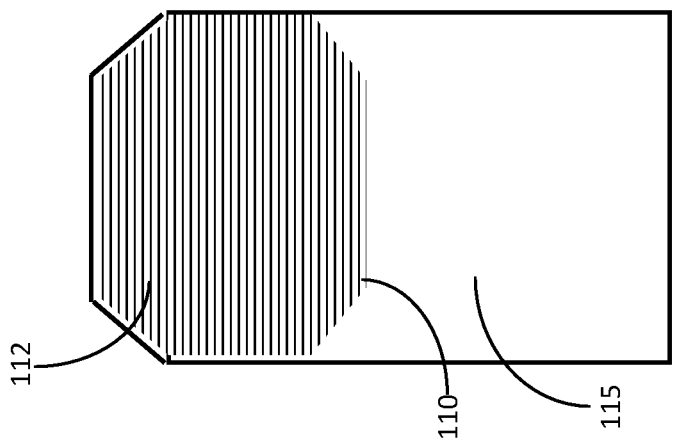
Figure 2A:
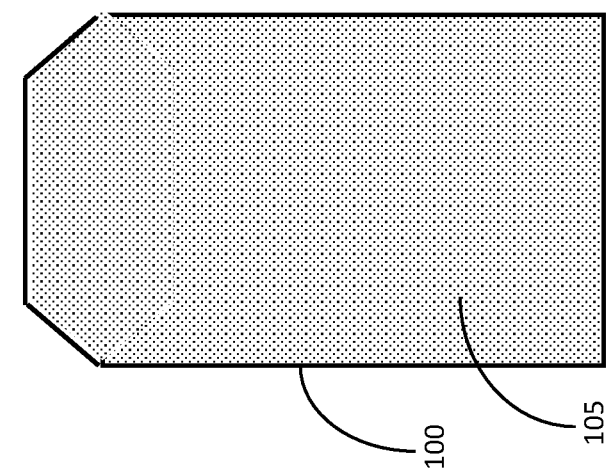

Referring to FIG. 2, a method for fabricating a single master grating tool is represented in five stages by FIGS. 2a to 2e.

At a first stage, represented in FIG. 2a, a single master grating tool substrate 100 is coated with a photoresist layer 105.

At a second stage, represented in FIG. 2b, a mask is used to cover all except a first area 110 of the photoresist layer 105. A fringe pattern 112 for a first diffraction grating is recorded in the exposed first area 110 of the photoresist layer 105, for example using a laser-derived interference pattern, while the remaining area 115 of the photoresist layer 105 remains covered by the mask.

At a third stage, represented in FIG. 2c, a different mask is used to expose a second area 120 of the photoresist layer 105. A fringe pattern 122 for a second diffraction grating is recorded in the exposed second area 120 of the photoresist layer 105, for example using a laser-derived interference pattern, while the remaining area 125 of the photoresist layer 105 remains covered by the mask.

At a fourth stage, represented in FIG. 2d, the photoresist layer 105 is developed and photoresist in the first and second areas 110, 120 is removed according to where the fringe patterns 112, 122 for the first and second gratings respectively were recorded, exposing a corresponding pattern of underlying tool substrate 100. First and second master grating profiles 130, 135 are then etched into the master tool substrate 100 in the areas 110, 120 respectively, following the grating patterns 112, 122, respectively, where the photoresist 105 has been removed. The master grating profiles 130, 135 may be etched using for example ion beam etching. If necessary, several stages of exposure and etching may be required to create the required first and second grating profiles 130, 135 in the tool substrate 100.

At a fifth stage, represented in FIG. 2e, any remaining photoresist 105 is removed to leave the etched first and second grating profiles 130, 135 formed in the tool substrate 100. The principle advantage of this technique is that any edges to the grating profiles are very small so that when the master grating tool is used to imprint the first and second grating profiles 130, 135 into a replication layer of UV-curable polymer, no significant protrusions remain in the replication layer. The problem described above with reference to FIG. 1c is therefore avoided.

Figure 3:
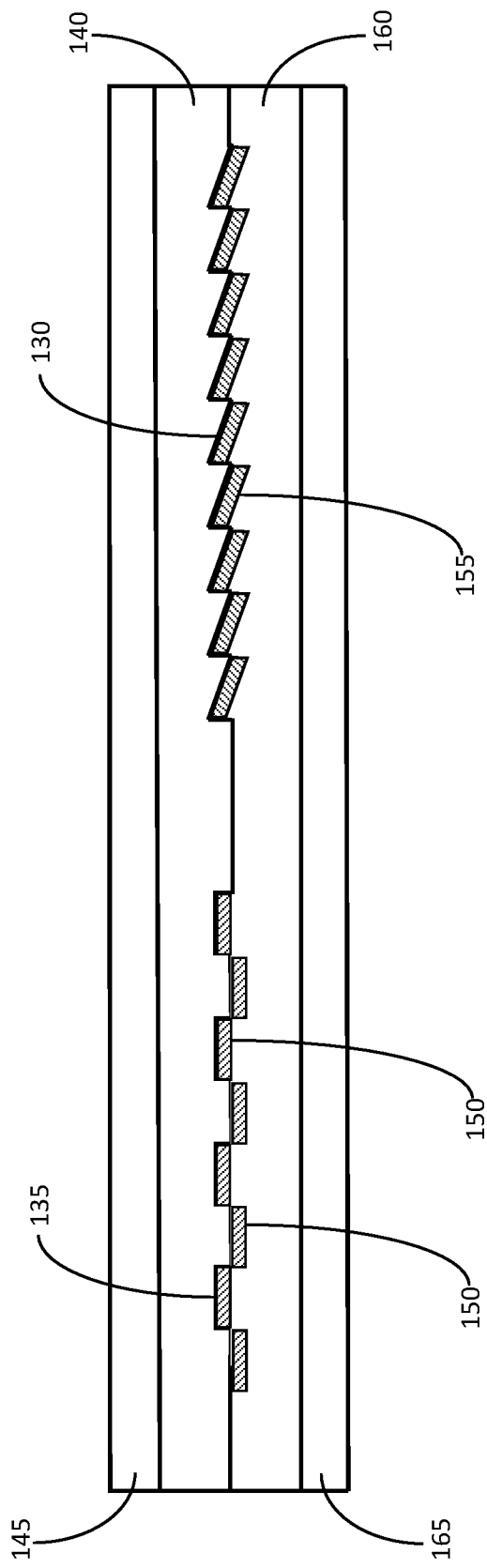
FIG. 3 is a representation of an example of a waveguide fabricated using the example master grating tool of FIG. 2, according to the present disclosure.

Referring to FIG. 3, an example of a waveguide that has been fabricated using the single master grating tool shown in FIG. 2e, is represented in a sectional view. As can be seen in FIG. 3, the first and second grating profiles 130, 135 are replicated in a replication layer 140, for example by embossing in a layer 140 of UV-curable polymer applied to a first outer glass layer 145 of the waveguide. Unlike the prior art waveguide shown in FIG. 1b and FIG. 1c, in a waveguide according to the present disclosure made by replication from the single master grating tool shown in FIG. 2e, here are no significant protrusions in the replication layer 140 caused by edges of the first and second grating profiles 130, 135.

After coating the first and second grating profiles 130, 135 with respective dielectric coatings 150, 155, a lamination layer 160 of substantially the same UV-curable polymer material as used for the replication layer 140 is applied to cover the first and second gratings 130, 135. The lamination layer 160 of UV-curable polymer is firstly applied to a second outer glass layer 165 and the combination is then pressed against the replication layer 140 so that the UV-curable polymer contacts the entire surface of the coated first and second grating profiles 130, 135 conformably, leaving no gaps. The UV-curable polymer of the lamination layer 160 is then cured with UV light.

According to the present disclosure, in a second improvement, a different method has been devised to make a waveguide incorporating two or more diffraction gratings. This method will now be described with reference to FIG. 4 and to FIG. 5.

Figure 4A:
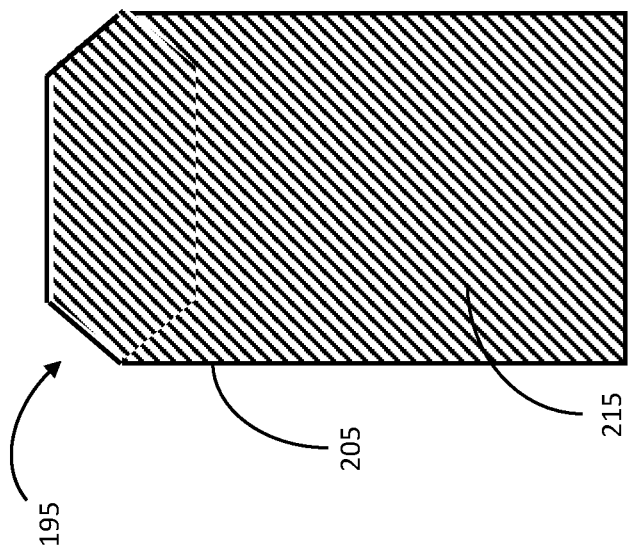
FIG. 4 is a representation of an example of a process according to the present disclosure for fabricating a waveguide according to the present disclosure.
Figure 4A:
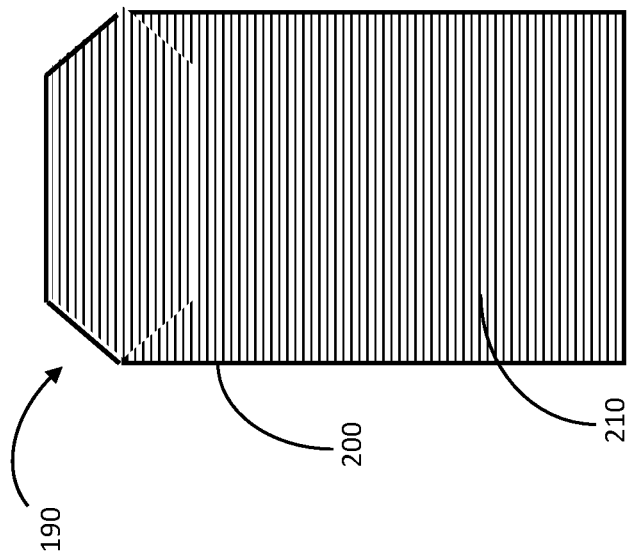
Figure 4B:
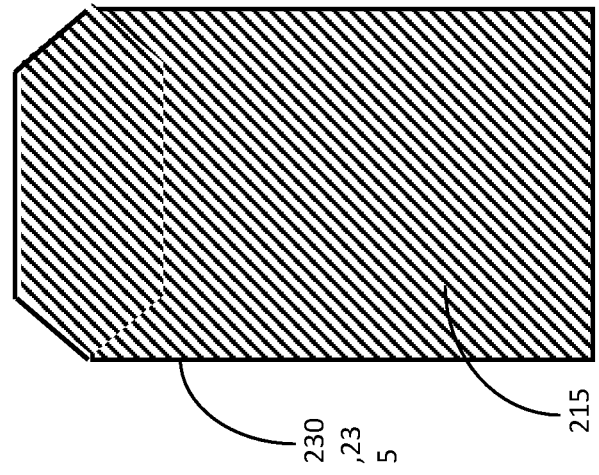
Figure 4B:
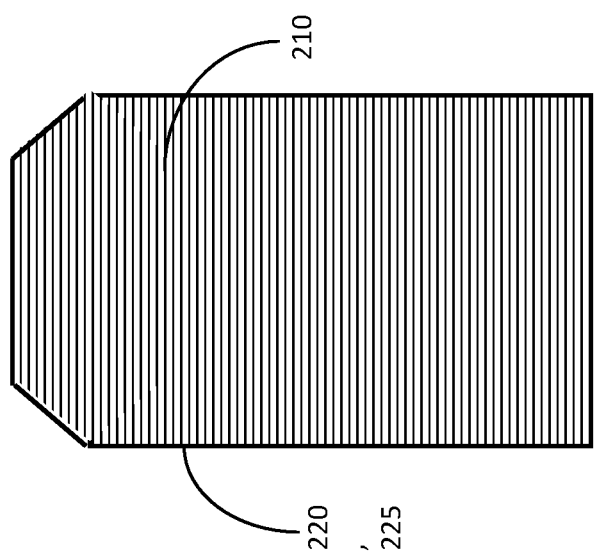
Figure 4C:
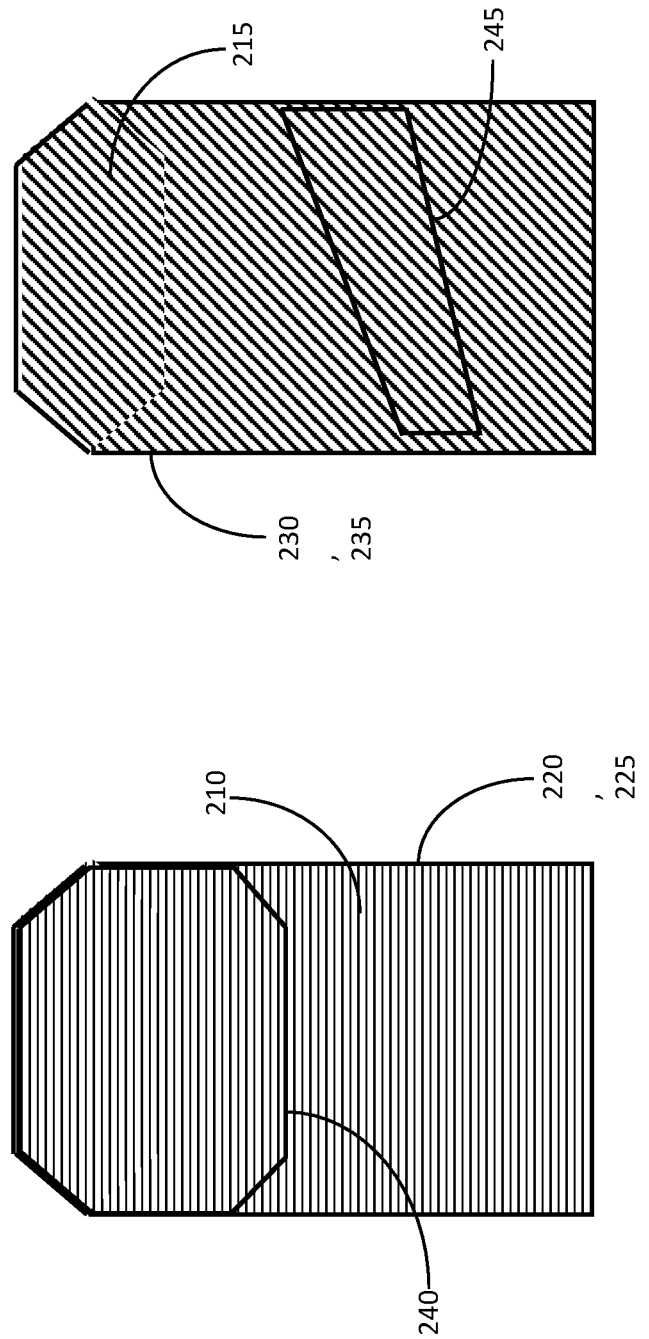
Figure 5:
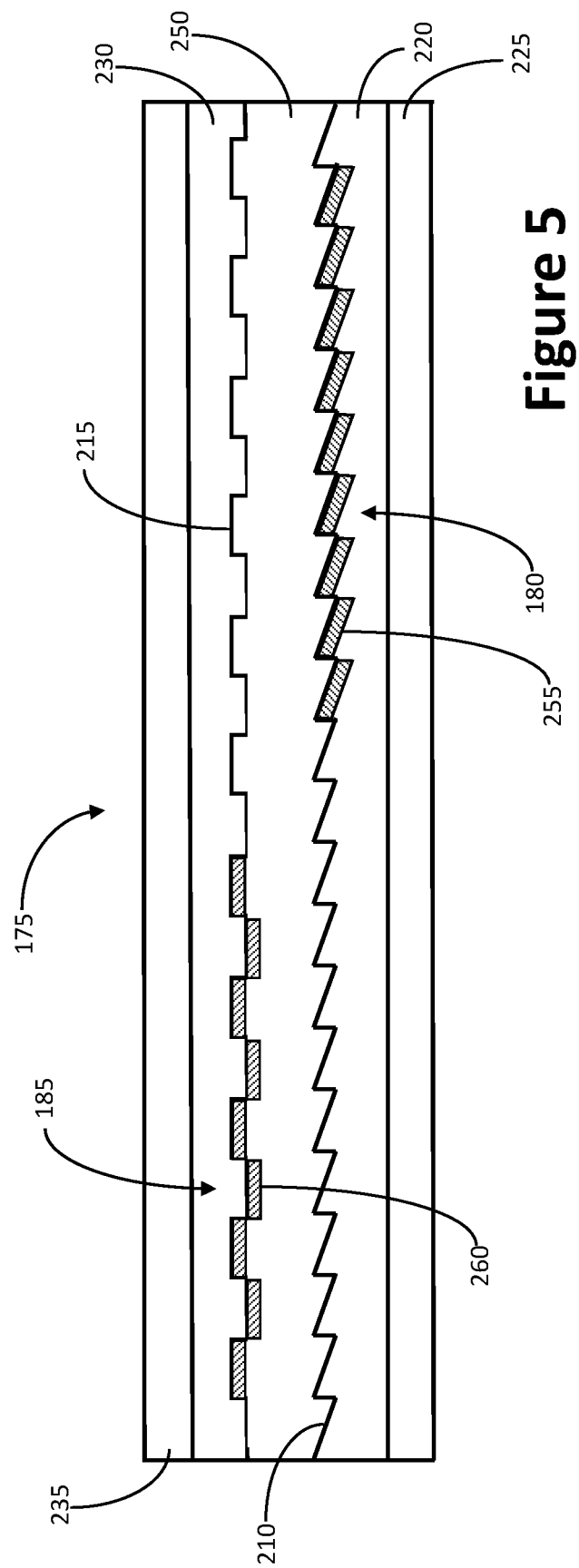
FIG. 5 is a representation of an example of a waveguide according to the present disclosure, fabricated according to the example process represented in FIG. 4.

Referring to FIG. 4 and to FIG. 5, a method for fabricating a waveguide 175, for example a waveguide 175 incorporating first and second diffraction gratings 180, 185 respectively, as shown in a sectional view in FIG. 5, is represented in FIGS. 4a to 4c as a four-stage process.

At a first stage, represented in FIG. 4a, a first master grating tool 190 and a second master grating tool 195 are fabricated on respective tool substrates 200, 205 using a technique as described for example in a published paper: Smith, D. J., et al. "Large area pulse compression gratings fabricated onto fused silica substrates using scanning beam interference lithography", 3rd Int'l Conf. *Ultrahigh Intens. Lasers: Dev. Sci. Emerg. Appl* (2008). By this published technique, or by other known techniques, grating profiles may be formed over a relatively large area, in particular over an area sufficiently large to enable first and second master grating profiles 210, 215 to be formed over substantially the whole area of a surface of the respective tool substrates 200, 205. The tool substrates 200, 205 have an area of at least the area of a surface of the waveguide 175 to be fabricated.

According to one such technique, similar to that described above with reference to FIG. 2, a layer of a photoresist is applied firstly over substantially all of a surface of each of the first and second tool substrates 200, 205. A laser-derived interference pattern forming a first grating pattern corresponding to the first master grating profile 210 is generated and recorded over substantially the whole of the area of the photoresist applied to the first tool substrate 200, for example by scanning according to the above-referenced paper. Similarly, a laser-derived interference pattern forming a second grating pattern corresponding to the second master grating profile 215 is generated and recorded over substantially the whole of the area of the photoresist applied to the second tool substrate 200, for example by the same technique. The photoresists are then developed, removing photoresist according to the first and second grating patterns to cause corresponding patterns of exposure of the underlying first and second tool substrates 200, 205, respectively. An etching technique, for example ion-beam etching, is then used to etch the first and second master grating profiles 210, 215 into the exposed first and second grating patterns of the underlying first and second tool substrates 200, 205, respectively. Any remaining photoresist is then removed from the first and second tool substrates 200, 205 to complete the fabrication of the first and second master grating tools 190, 195.

At a second stage, represented in FIG. 4b, the first master grating profile 210 of the first master grating tool 190 is replicated in a first replication layer 220 applied to a first outer glass layer 225 of the waveguide 175, for example using one of the techniques described above with reference to FIG. 1*a*. In one such technique, the grating profile 210 of the first master grating tool 190 may be replicated across the whole area of the first replication layer 220, comprising a layer 220 of UV-curable polymer applied to the first outer glass layer 225, by embossing. Similarly, the second master grating profile 215 of the second master grating tool 195 is replicated across the whole area of a second replication layer 230, for example a layer 230 of UV-curable polymer applied to a second outer glass layer 235 of the waveguide 175, for example using the same technique as for the first replication layer 220, by embossing.

At a third stage, represented in FIG. 4*c*, an area 240 of the first grating profile 210, corresponding to the intended area of the first diffraction grating 180, is coated with a layer 255 of dielectric material. Similarly, an area 245 of the second grating profile 215, corresponding to the intended area of the second diffraction grating 185, is coated with a layer 260 of dielectric material.

At a fourth stage, the waveguide is assembled by applying a lamination layer 250 of a UV-curable polymer, substantially the same as that used for the first and second replication layers 220, 230, to cover one or both of the grating profiles 210, 215 formed in the first and second replication layers 220, 230. The assemblies of first replication layer 220 and first outer glass layer 225 and of the second replication layer 230 and second outer glass layer 235 are then brought together, under pressure, thereby to sandwich the lamination layer 250 of UV-curable polymer between the first and second replication layers 220, 230. This ensures that the layer 250 of UV-curable polymer fills the space between the two replication layers 220, 230 leaving no gaps. The polymer forming the lamination layer 250 is then cured and fabrication of the waveguide 175 is substantially complete.

Those regions of the first and second grating profiles 210, 215 that were not coated in a dielectric material form a direct interface between the materials of the respective replication layer 220, 230 and the lamination layer 250. Due to the substantially matching refractive indices of the polymers used in the replication and lamination layers 220, 230, 250, this interface would have almost no diffractive effect on light propagating through the waveguide 175. The diffractive efficiency of the regions coated by the dielectric layers 255, 260, intended to form the first and second diffraction gratings 180, 185 respectively, is of a much higher order.

As for the first example according to the present disclosure, described above with reference to FIG. 2 and FIG. 3, no part of the replication layers 220, 230 protrudes significantly into the lamination layer 250, so avoiding the problem with prior art waveguides described above with reference to FIG. 1*c*.

One advantage of the method for fabricating a waveguide 175 according to FIG. 4 and FIG. 5, as compared with that described above with reference to FIG. 2 and FIG. 3, is that the same master grating tools 190, 195 may be used in fabricating waveguides with the same grating profiles 210, 215 but with other diffraction grating configurations. It is only when the dielectric layers 255, 260 have been applied to selected areas 240, 245 of the replicated grating profiles 210, 215 that the diffraction grating regions 180, 185 are defined. That is, diffraction gratings 180, 185 of different sizes, shapes and positions within a waveguide 175 may be fabricated using grating profiles 210, 215 replicated from the same master grating tools 190, 195, simply by applying dielectric coatings 255, 260 to different areas of the replicated grating profiles 210, 215 before laminating the two replicated grating structures 220, 225, 230, 235 together.

In some examples, a method for fabricating a waveguide master grating imprint tool is described. The method comprises: coating a substrate with at least one photoresist layer; selectively exposing a first diffraction grating master profile onto a first area of the at least one photoresist layer; selectively exposing a second diffraction grating master profile onto a second area of the at least one photoresist layer; and processing the substrate to form the first diffraction grating master profile and the second diffraction grating master profile, wherein each of the first diffraction grating profile and the second diffraction grating profile comprises an edge between the substrate and the respective grating profile that is substantially perpendicular to the substrate surface and each of the edges is substantially the same height as a maximum depth of the first diffraction grating master profile and the second diffraction grating master profile.

In some examples, the method may further comprise etching the substrate to form the first diffraction grating master profile and the second diffraction grating master profile; and removing the at least one photoresist layer from the substrate.

In some examples, the method the first diffraction profile master pattern may be different from the second diffraction grating master profile.

In some examples, a master grating imprint tool for fabricating a waveguide is described. The master grating tool comprising: a substrate; a first diffraction grating profile etched into a first area of the substrate; a second diffraction grating profile etched into a second area of the substrate; and wherein each of the first diffraction grating profile and the second diffraction grating profile comprises an edge between the substrate and the respective grating profile that is substantially perpendicular to the substrate surface, and each of the edges is substantially the same height as a maximum depth of the first diffraction grating master profile and the second diffraction grating master profile.

In some examples, the edge between the substrate and the respective grating profile is less than 25 millimetres.

In some examples, a method to fabricate a waveguide comprising a least two diffraction grating profiles is described. The method comprising: using the waveguide master grating imprint tool according to any of claims 3 to 5 to replicate the first diffraction grating master profile and second diffraction grating master profile to form a first diffraction grating profile and second diffraction grating profile, wherein the first diffraction grating master profile and second diffraction grating master profile are imprinted in the same process step; applying at least one dielectric layer over the first diffraction grating pattern and second diffraction grating pattern.

In some examples, the first diffraction grating profile and second diffraction grating profile comprise at least one of an input grating and an output grating.

In some examples, a waveguide may be fabricated using the method according to some examples. The waveguide may comprise: a substrate; a first diffraction grating profile and a second diffraction grating profile; wherein each of the first diffraction grating profile and the second diffraction grating profile comprises an edge between the substrate and the respective grating profile that is substantially perpendicular to the substrate surface, and each of the edges is substantially the same height as a maximum depth of the first diffraction grating master profile and the second diffraction grating master profile.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method for fabricating a waveguide, the method comprising:
   (i) fabricating a first master grating tool comprising a first tool substrate having a surface with an area corresponding at least to the area of a surface of the waveguide and having a first uniform grating profile formed over substantially all of the surface of the first tool substrate;
   (ii) fabricating a second master grating tool comprising a second tool substrate having a surface with an area corresponding at least to the area of the surface of the waveguide and having a second uniform grating profile formed over substantially all of the surface of the second tool substrate;
   (iii) using the first master grating tool to replicate the first uniform grating profile over substantially all of a surface of a first waveguide substrate that extends from a first edge of the first waveguide substrate to a second edge of the first waveguide substrate;
   (iv) using the second master grating tool to replicate the second uniform grating profile over substantially all of a surface of a second waveguide substrate that extends from a first edge of the second waveguide substrate to a second edge of the second waveguide substrate;
   (v) applying a first dielectric layer over a selected area of the first uniform grating profile replicated on the surface of the first waveguide substrate;
   (vi) applying a second dielectric layer over a selected area of the second uniform grating profile replicated on the surface of the second waveguide substrate; and
   (vii) applying a layer of laminating material to at least one of the surfaces of the first and second waveguide substrates and bringing the surfaces of the first and the second waveguide substrates together thereby to join the first and second waveguide substrates together by an intermediate lamination layer.

2. The method according to claim 1, wherein fabricating the first and the second master grating tool, at (i) and (ii), comprises:
   (a) applying a layer of photoresist over substantially the whole of a surface of each of the first and the second tool substrates;
   (b) exposing the photoresist applied to the first tool substrate to record a first grating pattern corresponding to the first uniform grating profile over substantially the whole area of the photoresist;
   (c) exposing the photoresist applied to the second tool substrate to record a second grating pattern corresponding to the second uniform grating profile over substantially the whole area of the photoresist;
   (d) developing the photoresist applied to each of the first and the second tool substrates, thereby to remove photoresist in patterns corresponding to the first and second grating patterns, respectively;
   (e) etching the first uniform grating profile into the first tool substrate according to the first grating pattern and the second uniform grating profile into the second tool substrate according to the second grating pattern; and
   (f) removing any of the photoresist layer remaining on the first and the second tool substrates.

3. The method according to claim 2, wherein recording the first and the second grating pattern, at (b) and (c), comprises using a scanning beam interference lithography method to generate interference patterns corresponding to the first and second grating patterns thereby to expose the photoresist layer applied to the first and the second tool substrates respectively.

4. The method according to claim 1, wherein replicating the first and the second uniform grating profiles, at (iii) and (iv), comprises replicating the first and second uniform grating profiles in first and second replication layers applied to the first and second waveguide substrates, respectively.

5. The method according to claim 4, wherein at least one of the first and second replication layers comprises a layer of a UV-curable polymer.

6. The method according to claim 5, wherein the intermediate lamination layer comprises a layer of a UV-curable polymer having substantially the same refractive index as the UV-curable polymer used to form the at least of the first and second replication layers.

7. The method according to claim 1, wherein at least one of the first and second waveguide substrates comprises a layer of glass.

8. A waveguide, comprising:
   a first waveguide substrate having a surface extending from a first edge of the first waveguide substrate to a second edge of the first waveguide substrate, and a first uniform diffraction grating profile replicated over substantially the whole of the surface of the first waveguide substrate;
   a second waveguide substrate having a surface extending from a first edge of the second waveguide substrate to a second edge of the second waveguide substrate, and a second uniform diffraction grating profile replicated over substantially the whole of the surface of the second waveguide substrate;
   a first dielectric layer applied to a selected area of the first uniform diffraction grating profile;
   a second dielectric layer applied to a selected area of the second uniform diffraction grating profile; and
   an intermediate lamination layer bonding the surface of the first waveguide substrate to the surface of the second waveguide substrate.

9. The waveguide according to claim 8, comprising a first replication layer applied over the surface of the first waveguide substrate and a second replication layer applied over the surface of the second waveguide substrate and wherein the first uniform first diffraction grating profile is replicated in the first replication layer and the second uniform diffraction grating profile is replicated in the second replication layer.

10. The waveguide according to claim 9, wherein at least one of the first and second replication layers comprises a layer of a UV-curable polymer.

11. The waveguide according to claim 10, wherein the intermediate lamination layer comprises a layer of a UV-curable polymer having substantially the same refractive index as the UV-curable polymer used for the at least one replication layer.

12. The method according to claim 1, wherein fabricating the first master grating tool, at (i), comprises:

(a) applying a layer of photoresist over substantially the whole of a surface of the first tool substrate;
(b) exposing the photoresist applied to the first tool substrate to record a grating pattern corresponding to the first uniform grating profile over substantially the whole area of the photoresist;
(c) developing the photoresist applied to the first tool substrate, thereby to remove photoresist in one or more patterns corresponding to the grating pattern;
(d) etching the first uniform grating profile into the first tool substrate according to the grating pattern; and
(e) removing any of the photoresist layer remaining on the first tool substrate.

13. The method according to claim 12, wherein recording the grating pattern, at (b), comprises using a scanning beam interference lithography method to generate one or more interference patterns corresponding to the grating pattern thereby to expose the photoresist layer applied to the first tool substrate.

14. The method according to claim 1, wherein fabricating the second master grating tool, at (ii), comprises:
(a) applying a layer of photoresist over substantially the whole of a surface of the second tool substrate;
(b) exposing the photoresist applied to the second tool substrate to record a grating pattern corresponding to the second uniform grating profile over substantially the whole area of the photoresist;
(c) developing the photoresist applied to the second tool substrate, thereby to remove photoresist in one or more patterns corresponding to the grating pattern;
(d) etching the second uniform grating profile into the second tool substrate according to the grating pattern; and
(e) removing any of the photoresist layer remaining on the second tool substrate.

15. The method according to claim 14, wherein recording the grating pattern, at (b), comprises using a scanning beam interference lithography method to generate one or more interference patterns corresponding to the grating pattern thereby to expose the photoresist layer applied to the second tool substrate.

16. The method according to claim 1, wherein replicating the first uniform grating profile, at (iii), comprises replicating the first uniform grating profile in a replication layer applied to the first waveguide substrate.

17. The method according to claim 1, wherein replicating the second uniform grating profile, at (iv), comprises replicating the second uniform grating profile in a replication layer applied to the second waveguide substrate.

18. A waveguide, comprising:
a first waveguide substrate having a surface extending from a first edge of the first waveguide substrate to a second edge of the first waveguide substrate, and a first uniform diffraction grating profile over substantially the whole of the surface of the first waveguide substrate;
a second waveguide substrate having a surface extending from a first edge of the second waveguide substrate to a second edge of the second waveguide substrate, and a second uniform diffraction grating profile over substantially the whole of the surface of the second waveguide substrate;
a first dielectric layer over an area of the first uniform diffraction grating profile;
a second dielectric layer over an area of the second uniform diffraction grating profile; and
an intermediate layer bonding the surface of the first waveguide substrate to the surface of the second waveguide substrate.

19. The waveguide according to claim 18, comprising a replication layer over the surface of at least one of the first and the second waveguide substrates and wherein the at least one of the first and the second uniform diffraction grating profiles is replicated in the respective replication layer.

20. The waveguide according to claim 19, wherein the replication layer comprises a layer of a polymer, and the intermediate layer comprises a layer of a polymer having substantially the same refractive index as the polymer used for the replication layer.

* * * * *